United States Patent
Scholl et al.

(10) Patent No.: US 6,840,218 B2
(45) Date of Patent: Jan. 11, 2005

(54) METHOD FOR DETECTING AND REGULATING THE START OF COMBUSTION IN AN INTERNAL COMBUSTION ENGINE

(75) Inventors: David James Scholl, Huntington Woods, MI (US); Urs Christen, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/324,862

(22) Filed: Dec. 19, 2002

(65) Prior Publication Data

US 2003/0145829 A1 Aug. 7, 2003

(30) Foreign Application Priority Data

Dec. 21, 2001 (EP) .............................................. 01130557

(51) Int. Cl.[7] ................................................. F02P 5/15
(52) U.S. Cl. .................... 123/435; 123/406.22; 701/102
(58) Field of Search ............................ 123/435, 406.22, 123/406.2, 406.29, 406.33, 406.34, 406.38; 701/111, 102; 73/117.3

(56) References Cited

U.S. PATENT DOCUMENTS

| 4,463,729 A | | 8/1984 | Wiegand et al. | |
|---|---|---|---|---|
| 4,760,830 A | | 8/1988 | Wiegand et al. | |
| 4,919,099 A | * | 4/1990 | Extance et al. | ........ 123/406.28 |
| 5,359,883 A | * | 11/1994 | Baldwin et al. | ............ 73/117.3 |
| 5,765,532 A | * | 6/1998 | Loye | ........................... 123/435 |
| 6,598,468 B2 | * | 7/2003 | Zur Loye et al. | ........... 73/117.3 |
| 6,659,068 B2 | * | 12/2003 | Urushihara et al. | ......... 123/295 |

FOREIGN PATENT DOCUMENTS

| EP | 0071557 | | 5/1989 | |
|---|---|---|---|---|
| EP | 1132605 | | 9/2001 | |
| JP | 299562 | * | 11/1998 | ........... F02D/45/00 |
| WO | WO 9942718 | | 8/1999 | |

OTHER PUBLICATIONS

Reddy, Krishna, Mallan, Ganesan, Evaluation of Combustion Parameters in Direct Injection Diesel Engines—An Easy and Reliable Method, SAE Technical Paper Series No. 930605, Mar. 1, 1993.

* cited by examiner

*Primary Examiner*—Hai Huynh
(74) *Attorney, Agent, or Firm*—Diana D. Brehob (57) ABSTRACT

The invention relates to a method for detecting the start of combustion in the combustion chamber of an engine with autoignition. In the method, the profile of the cylinder pressure is measured and the signal which is obtained in this way is transformed using wavelet functions. A sudden rise in the absolute value of the wavelet coefficients which are obtained indicates the start of combustion. The simple and at the same time precise detection of the start of combustion which is possible in this way can be used within the framework of a feedback regulation—by changing engine operating parameters such as, for example, the start of injection of the fuel—to regulate the start of combustion in a desired way.

19 Claims, 6 Drawing Sheets

Fig. 1

Fig. 2 Crankshaft angle [°]

Fig. 3

Fig. 4 Crankshaft angle [°]

METHOD FOR DETECTING AND REGULATING THE START OF COMBUSTION IN AN INTERNAL COMBUSTION ENGINE

FIELD OF THE INVENTION

The invention relates to a method for detecting the start of combustion in the combustion chamber of an internal combustion engine with autoignition, with the cylinder pressure signal being measured. In addition, the invention relates to a method for regulating the start of combustion in the combustion chamber of an internal combustion engine having autoignition by changing engine operating parameters. Furthermore, the invention relates to an engine controller for an internal combustion engine with autoignition with an input for a cylinder pressure signal.

BACKGROUND OF THE INVENTION

In internal combustion engines with autoignition or compression-dependent ignition, the start of the combustion depends on various operating parameters such as, for example, cylinder pressure, temperature, oxygen concentration and, in engines with direct injection, timing of fuel injection. Many effects of the combustion process, for example, the torque, the emissions and combustion noise, depend on the start of combustion. For this reason, it is important to detect and regulate the start of combustion.

In the motor vehicle engines that are currently on the market, the start of combustion is not measured and is controlled only indirectly by adapting the timing of the fuel injection on the basis of the engine speed and torque.

Such open loop control is not sufficiently robust as, for example, reacting to changes in the fuel quality or imprecisions in the fuel injection devices which lead to deviation in the start of injection.

Known laboratory methods for determining the start of combustion are generally based on calculations of the heat release rate based on cylinder pressure signals, the start of combustion being defined as that point at which the heat release rate changes from negative to positive. Alternatively, the heat release rate can be extrapolated such that, the intersection between this gradient and the zero line defines the start of combustion. Furthermore, the start of combustion can be determined by differentiation of the cylinder pressure profile. The detection is easier and more precise if the difference between the cylinder pressure and an isentropic compression (without combustion) is used.

In addition, EP 1,132,605 A2 discloses a method for determining the start of combustion in which a continuous comparison takes place between a current measured value and a continuous averaged value of the previous measured values. If in the process a difference above a predefined threshold value occurs, that measured point among the previous measured points which is the first above the average value is searched for and it is assumed that the combustion has started at the corresponding time. A disadvantage here is that this method is susceptible to faults with respect to random fluctuation of the cylinder pressure signal.

SUMMARY OF THE INVENTION

A method for detecting the start of combustion in a combustion chamber of an internal combustion engine, a cylinder pressure signal being generated, the method comprising processing the cylinder pressure signal with a wavelet transformation which provides wavelet coefficients, and comparing said wavelet coefficients to an evaluation criterion to determine a start of combustion in said combustion chamber.

In the method for detecting the start of combustion in the combustion chamber of an internal combustion engine, the cylinder pressure is calculated from a direct or indirect measurement of cylinder pressure as a function of crank angle. The method includes processing the acquired cylinder pressure signal with a wavelet transformation and provides wavelet coefficients, which when compared to an evaluation criterion, determines when combustion started.

Also disclosed is a method for regulating the start of combustion in a combustion chamber of an internal combustion engine. The method includes detecting the start of combustion by generating a signal indicating cylinder pressure, processing the cylinder pressure signal with a wavelet transformation which provides wavelet coefficients, and determining the start of combustion based on comparing the wavelet coefficients with a predetermined threshold value. Based on the detected start of combustion an engine parameter is adjusted. The engine parameter is preferably fuel injection timing.

A wavelet transformation is a mathematical operation, which is similar to a Fourier transformation, for analysing or decomposing the components of a signal However, in contrast with the Fourier transformation, not only the frequency content of the signal is revealed but also a local analysis (with respect to the independent variables of the signal, typically the location or the time) is performed. These properties of the wavelet transformation are utilized in the proposed method to detect discontinuities in the signal or in its derivatives. Here, a significant change in the gradient of the cylinder pressure signal, which is caused by the start of the combustion, is detected and its location determined. As the coefficients of the wavelet transformation can be assigned locally to the signal profile, determining the coefficients which indicate the start of combustion simultaneously reveals the time of the start of combustion. The method according to the invention has the advantage that it operates directly with the cylinder pressure signal and does not rely on variables derived from it, for example the heat release rate, which can introduce additional errors. An additional advantage provided is that, the method is based on an analysis of the entire profile of the cylinder pressure signal over at least one engine cycle and is therefore robust with respect to faults at discrete points. Yet another advantage is that, further applications of the wavelet transformation, for example the definition of a noise index, can be performed without additional computational effort. Various applications (cf. European patent application No. 00710035.7).

The evaluation criterion mentioned above is defined by the sudden rise in the absolute value of said wavelet coefficients exceeding a predetermined threshold value of the wavelet coefficients. That is to say that from the calculated wavelet coefficients that wavelet coefficient whose absolute value exceeds the predefined threshold for the first time, viewed within the profile of the signal, is selected in accordance with the criterion. This relatively large coefficient indicates that at the associated location there is an acute change in the profile of the cylinder pressure signal which in turn indicates the start of combustion which is to be detected.

The predefined threshold value on which said evaluation criterion is based preferably on engine operating parameters so that the latter is adapted in an optimum way to the respective operating state of the internal combustion engine. In particular, the threshold value can depend, in accordance with empirical or theoretical relationships, on the speed and/or torque of the internal combustion engine.

In particular, a discrete wavelet transformation is used as the wavelet transformation. Functions which fulfill multi-resolution conditions (explanations below) are preferably used as the wavelet functions and scaling functions. With such functions it is possible for the calculation of the wavelet coefficients to be acquired by sequential or cascaded high-pass filtering and low-pass filtering of the cylinder pressure signal. This considerably simplifies the computational effort.

According to one development of the procedure mentioned above, the multi-resolution conditions which usually take place between the high-pass filtering operations and the low-pass filtering operations are omitted, as a result of which all the detail functions which are calculated with the wavelet transformation receive the same high resolution. As a result, the time of the start of combustion can be determined more precisely.

According to another development of the method, approximations are used for the wavelet functions and scaling functions. The approximation functions can be selected such that they permit a simpler and yet sufficiently precise calculation of the wavelet transformation.

The invention also relates to a method for regulating the start of combustion in the combustion chamber of an internal combustion engine having autoignition. The method influences time of the start of combustion by changing engine operating parameters, in particular the injection time of the fuel. The method is defined in that the start of combustion is detected using a method of the type explained above, and is used as a regulating variable for feedback control. The start of combustion is accordingly determined using a wavelet transformation of the cylinder pressure signal. The feedback control of the start of the combustion permits more stable and better operation of the engine. An advantage of this aspect of the invention is that start of combustion can be determined easily and with a high degree of precision. Allowing various possible ways of influencing the start of combustion time, examples are disclosed in U.S. Pat. No. 4,463,729, U.S. Pat. No. 4,760,830, EP 0,071,557 and WO 99/42718.

The invention also relates to an engine controller for an internal combustion engine with autoignition, the engine controller having an input for cylinder pressure signal. The engine controller determines the start of combustion from the input cylinder pressure signal according to a method of the type explained above. That is to say, the engine controller has instructions for determining the start of combustion from the cylinder pressure signal. Said instructions include processing the cylinder pressure signal with a wavelet transformation which provides wavelet coefficients and comparing said wavelet coefficients to an evaluation criterion to determine a start of combustion in said combustion chamber According to one development of the engine controller, it has outputs for engine operating parameters such as the time of fuel injection. The engine controller also permits a feedback control process of the start of combustion. The aforesaid engine controller is an electronic data processing unit or a microcomputer.

BRIEF DESCRIPTION OF THE DRAWINGS

The advantages described herein will be more fully understood by reading an example of an embodiment in which the invention is used to advantage, referred to herein as the Detailed Description, with reference to the drawings wherein.

DETAILED DESCRIPTION

Figure 1:
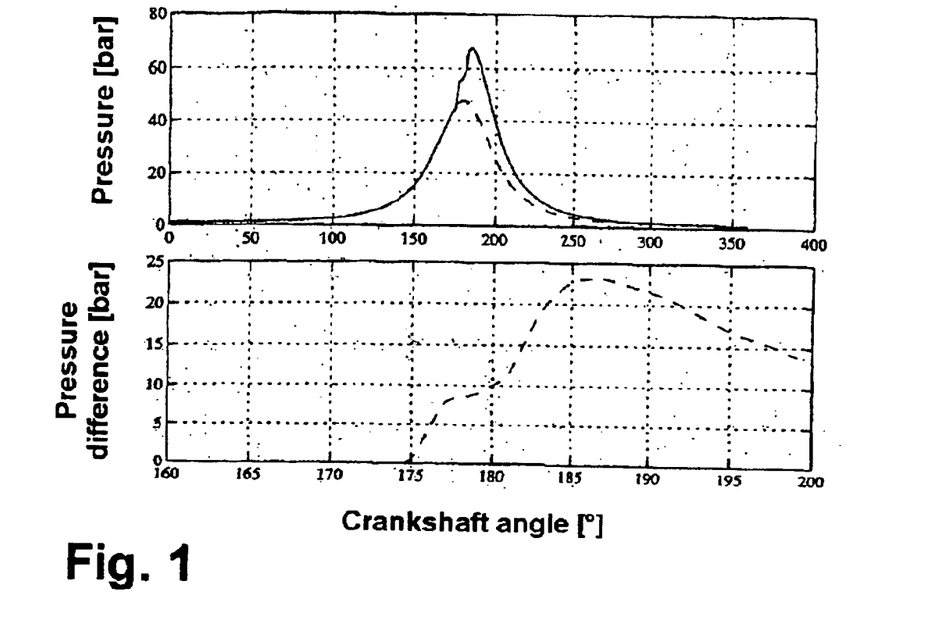
FIG. 1 shows an example of a measured cylinder pressure signal in comparison to an isentropic compression without heat input, the difference between the two signals is calculated and shown below on an enlarged scale.

FIG. 1 shows the profile of the cylinder pressure (unbroken line) of a 2.0 liter common rail engine at an engine speed of 800 rpm and a torque of 36 Nm, the pressure being plotted on the vertical axis in units of bar and the respective crankshaft angle being plotted on the horizontal axis. In addition, a calculated profile for an isentropic compression (without combustion) is illustrated as a dashed line in the upper diagram for the purposes of comparison. A quantity of 1 mg/cycle fuel was injected at 7.6° before top dead center (TDC corresponds to 180° on the horizontal axis). In the lower diagram in FIG. 1, the difference between the actual cylinder pressure for combustion and the calculated curve for isentropic compression is illustrated in an enlarged form. A difference between the two signals first occurs at approximately 5° before the top dead center, which can be interpreted as the start of combustion.

The difference between the precombustion and the main combustion cannot be determined from the resulting curve. In addition, the time of the start of combustion cannot be determined more precisely than the sampling rate of the pressure profile (2° crankshaft angle in the example).

Figure 2:
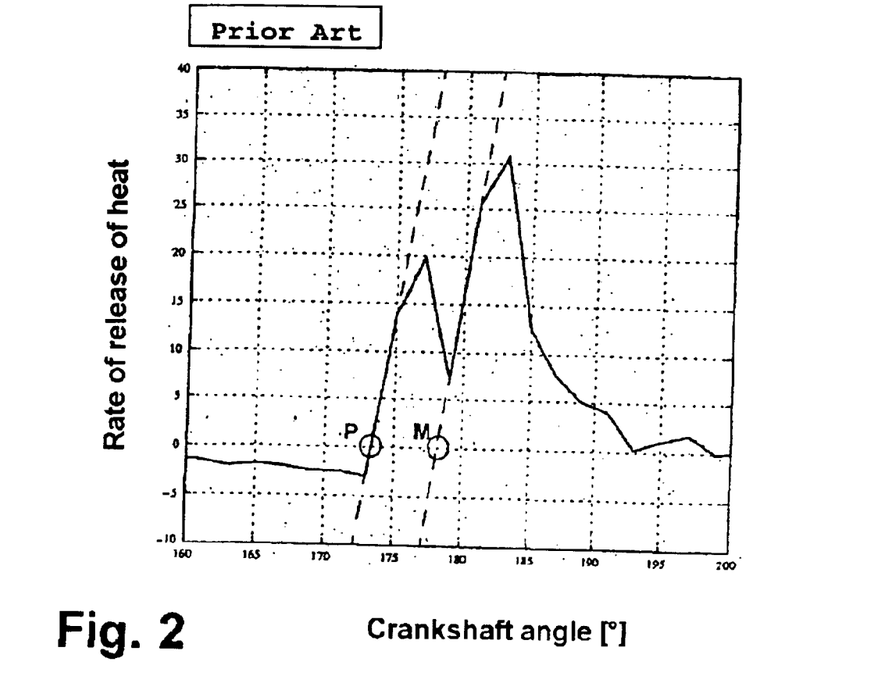
FIG. 2 shows an example of the determination of the start of combustion from the heat release rate, according to the prior art.

For reference purposes, FIG. 2 illustrates the calculation of the start of combustion on the basis of the heat release rate according to the prior art, for the cylinder pressure data of FIG. 1. In FIG. 2, the heat release rate is plotted on the vertical axis versus crankshaft angle. The start of combustion is determined as the point of intersection of the heat release rate with the zero line. According to this method, in the situation illustrated, the start of the precombustion is 6.7° BTDC, and the start of the main combustion at 1.8° BTDC. However, the method of determining the heat release rate is relatively complicated and has potential sources of error.

Figure 3:
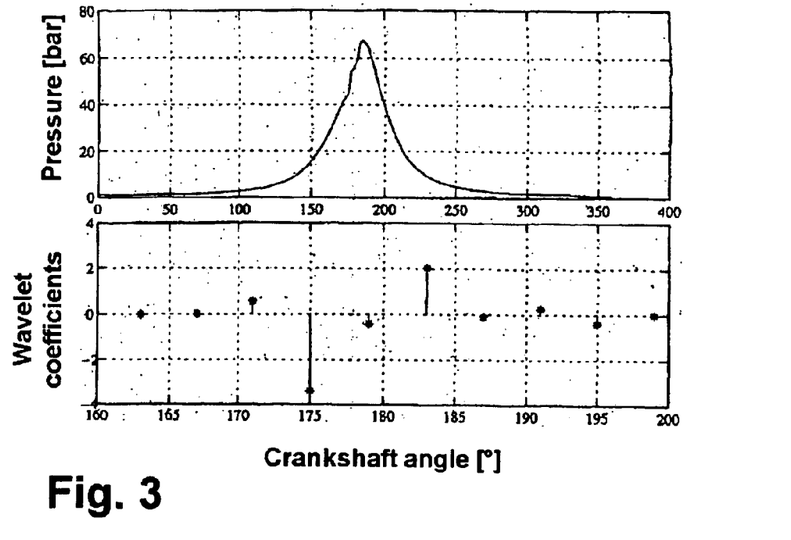
FIG. 3 shows the profile of the cylinder pressure signal over one revolution of the engine and the wavelet coefficients acquired therefrom using a coarse resolution.

The top diagram in FIG. 3 illustrates the measured profile of the cylinder pressure data of FIG. 1, while the lower diagram illustrates an enlarged detail of the wavelet coefficients calculated from this cylinder pressure signal. The first wavelet coefficient which is of a striking size in terms of its absolute value occurs 175°, (5° BTDC), which corresponds to the result from FIG. 1. However, the start of the precombustion and of the main combustion cannot be differentiated.

Figure 4:
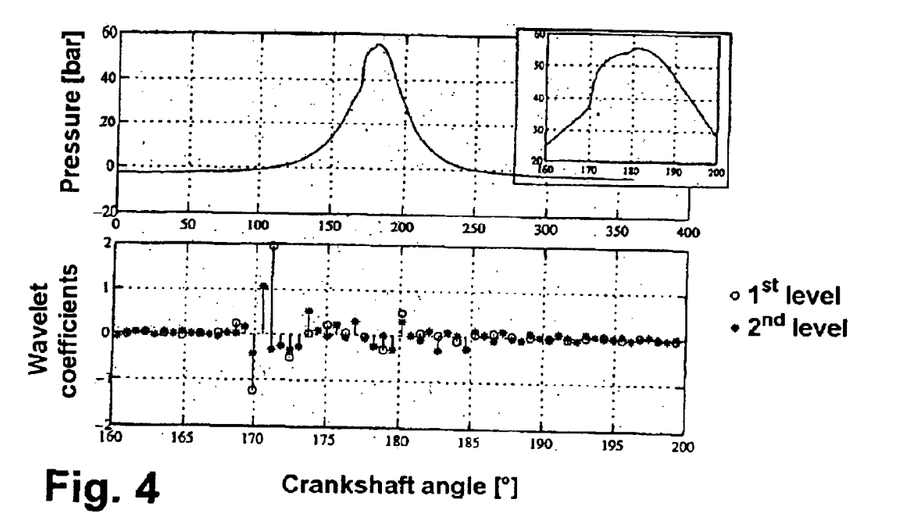
FIG. 4 shows the profile of the cylinder pressure signal over one revolution of the engine and the wavelet coefficients acquired therefrom, using a relatively fine resolution.

FIG. 4 shows the differentiating between the start of precombustion and main combustion is possible when a relatively high resolution is used. In the upper part of FIG. 4, the measured cylinder pressure profile from an engine operating at 800 rpm is illustrated, the profile having been sampled of 15 kHz. The wavelet coefficients, which are plotted in the lower diagram of FIG. 4, indicate that the start of the precombustion occurs at approximately 10° before the top dead center, and the start of the main combustion occurs approximately at the TDC. Between the two starts of combustion there is an angular difference of approximately 11.6°.

As is explained in more detail below within the framework of the general description of wavelet transformations, a wavelet transformation decomposes a signal into an approximation signal $\lambda_0(k)$ and a multitude of detail signals $\gamma_j(k)$. The transformation takes place in wavelet functions which fulfill the multi-resolution condition by repeated filtering of the original signal, which gives rise to detail signals with a high-frequency content:

$$\gamma_j(k) = \sum_n \tilde{g}(-n) \cdot \lambda_{j+1}(2k - n) \qquad (1)$$

$\tilde{g}$ being the filter which is applied to the approximation coefficients $\lambda_{j+1}$ of the preceding level of the wavelet transformation.

The detail signals of the highest level j contain the highest frequency information and provide the best resolution for determining the start of combustion. At lower levels, the number of points is lower due to the reduction in resolution which takes place at every step of the wavelength transformation. The absolute value of the detail coefficients at one of the highest transformation levels is then compared with a threshold value $\gamma_{thresh}$, which depends on engine operating conditions such as the engine speed, N, and the engine torque, $T_b$, as well as the transformation level, j:

$$|\gamma_j(k)| > \gamma_{thres,j}(N, T_b) \qquad (2)$$

The index k at which the threshold value is exceeded for the first time is then used to determine the start of combustion with respect to the crank angle. If the cylinder pressure signal is recorded as a function of the crank angle, this location-determining process is directly possible. If it is recorded on the basis of time, the position (crank angle) can be recorded at the same time as the pressure so that this position can be determined together with the index k or another function thereof.

Figure 5:
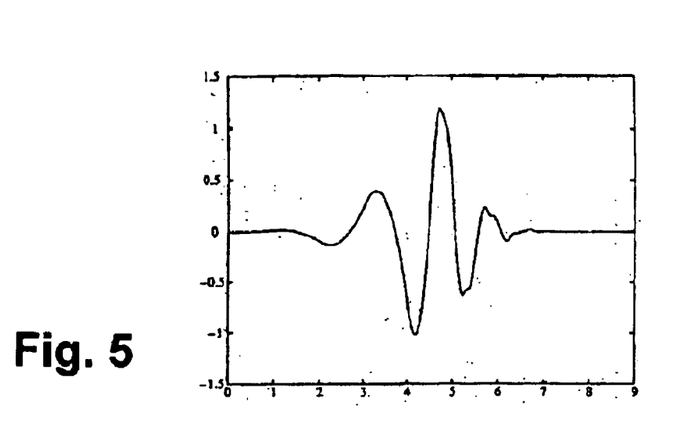
FIG. 5 shows a Daubéchies wavelet function of the $5^{th}$ order.
Figure 6:
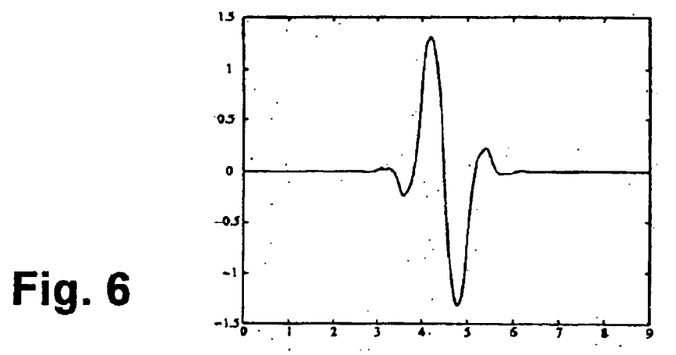
FIG. 6 shows a biorthogonal wavelet function of the $5^{th}$ order.

The wavelet functions which are used for the basis of the transformation have a large influence on the reliability and the quality of the resulting detection of the start of combustion. For detection of discontinuities in the cylinder pressure signal, wavelet functions with a relatively short carrier, i.e. a short interval on the real axis, on which the wavelet functions are different from zero, are preferably selected. The simplest example is the hair wavelet. Basically, all wavelets which can be advantageously used for edge detection when processing images are suitable. For the detection of discontinuities in the derivations of the cylinder pressure signal, regular wavelets of a relatively high order are required. Examples of this are the Daubéchies 3 or 5 (FIG. 5) wavelets or biorthogonal wavelets of the $5^{th}$ order (FIG. 6).

The algorithms for determining the start of combustion, which are explained above, can be developed in several ways. One possibility is to omit the resolution reduction after the high-pass filtering (see below) during the calculation of the detail coefficients. In this case, instead of a genuine wavelet, transformation, a convolution with the wavelet high-pass filter is performed:

$$\gamma_j(k) = \sum_n \tilde{g}(-n) \cdot \lambda_{j+1}(k - n) \qquad (3)$$

Figure 8:
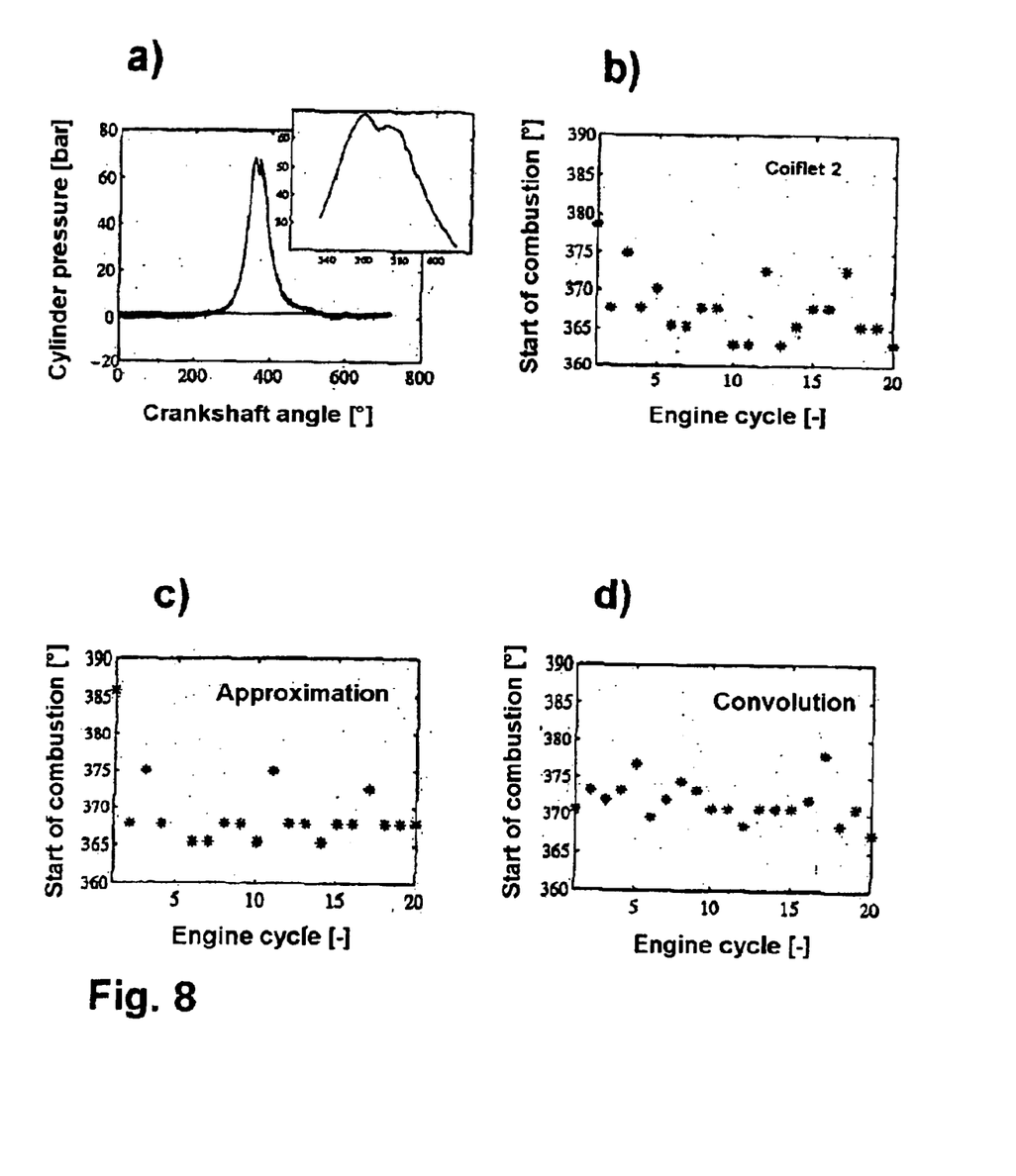
FIG. 8a shows a further example of measured cylinder pressure signals.
FIG. 8b shows determined times of the start of combustion from the signals in FIG. 8a using Coiflet-2 wavelet functions.
FIG. 8c shows determined times of the start of combustion from the signals of FIG. 8a using pseudo-wavelets.
FIG. 8d shows determined times of the start of combustion from the signals in FIG. 8a when carrying out a convolution instead of filtering with reduction of the resolution.

As a result, the entire number of points in the detail signal (cf. D. J. Scholl: Translation invariant data visualisation with orthogonal discrete wavelets, IEEE Transactions on Signal Processing, vol.46, pp 2031–2034, 1998). Such a procedure increases the resolution, and the process helps to determine the location of the start of combustion more precisely. The starts of combustion, which are detected when such a convolution is applied, are illustrated in FIG. 8d. Here, the cylinder pressure signal illustrated in FIG. 8a, which was recorded over 20 engine cycles at 3000 rpm and with a medium-sized torque, was transformed.

A single profile in the region of the peak pressure is seen in FIG. 8a. A sampling rate of 15 kHz was used which corresponds to an angular resolution of 0.8°.

A second development of the described algorithm consists in reducing the computational effort while approximately maintaining the reliability of the detection of the start of combustion. This is achieved by the transition from genuine wavelets to pseudo wavelets in which approximations of wavelets are optimized numerically for a good compromise between the number, n, of filter coefficients and the properties which are important for the specific application (cf. D. Scholl, A. Haddow, K. Collins: Optimization techniques for pseudo-wavelet filters, submitted to IEEE Transactions on Signal Processing, 2000). For the detection of the start of combustion, the aforesaid properties may be the asymmetry and the minimization of (at least) the first torque. The coefficients of a high-pass filter $\tilde{g}$ of a pseudo wavelet with good properties with respect to the detection of the start of combustion are:

{−0.09369, −0.09400, 0.6917, −0.6965, 0.9586, 0.09612, 0.01303, −0.01287}.

Figure 7:
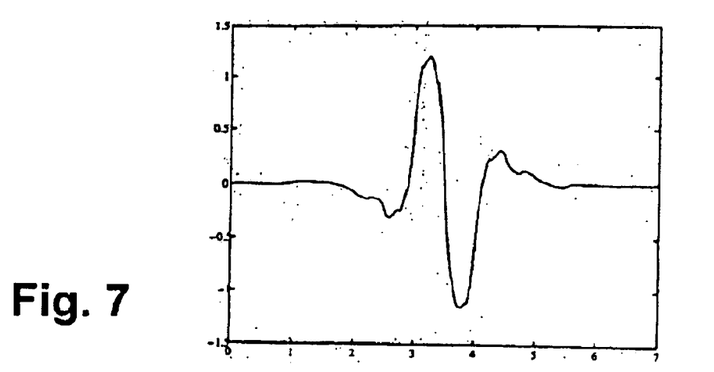
FIG. 7 shows a pseudo-wavelet function which is optimized for the method according to the invention.

FIG. 7 shows the associated pseudo-wavelet function. Results during the determination of the starts of combustion from the signal in FIG. 8a using this pseudo wavelet are illustrated in FIG. 8c. For the sake of comparison with this, FIG. 8b shows the results when a genuine wavelet function of the Coiflet 2 type is used.

If the wavelet transformation is to be employed simultaneously for multiple applications, in particular for detecting the start of combustion and the calculation of a combustion noise characteristic number, the pseudo-wavelet function can be optimized in such that a good compromise is obtained between the respective requirements of the applications.

Figure 12:
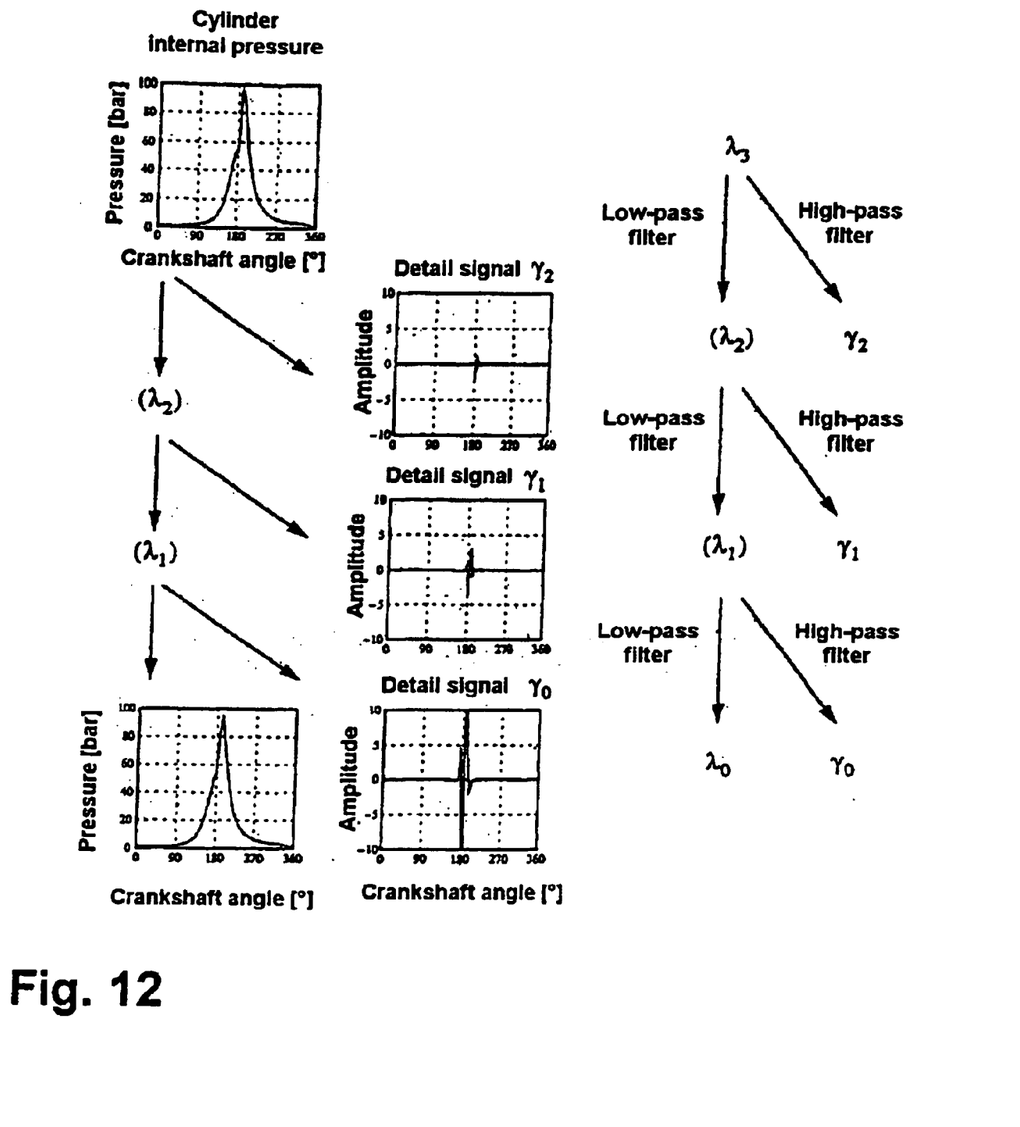
FIG. 12 shows a schematic view of a wavelet transformation of a cylinder pressure signal.

The technique of wavelet transformation will be explained in more detail below. A wavelet transformation is used to decompose a signal into an approximation signal and a detail signal. The approximation signal contains low-frequency information on the source signal and constitutes a type of continuous average value formation. The detail signal contains high-frequency information which is neglected in the approximation signal. FIG. 12 shows, by the example, the transformation of a cylinder pressure signal, showing the steps which occur during a wavelet transformation.

The decomposition of a source signal can be pursued to any desired level by using the approximation signal of the preceding level as the start signal, and a further step of the wavelet transformation is applied. This procedure leads to an approximation signal and a plurality of detail signals. The resulting signals continue to be in the time domain; however, information on the frequency content is also revealed as the spectra which are contained in each level of the detail signal are known. For this reason, at the same time information can be obtained about the behavior of the original signal in terms of time and frequency.

At each step of the transformation, the number of data points are retained: half of the data points store the approximation signal and the other half the detail signal. The entire procedure is without loss, i.e. the original signal can always be restored by applying the inverse wavelet transformation to the approximation and to the detail signals.

Figure 9:
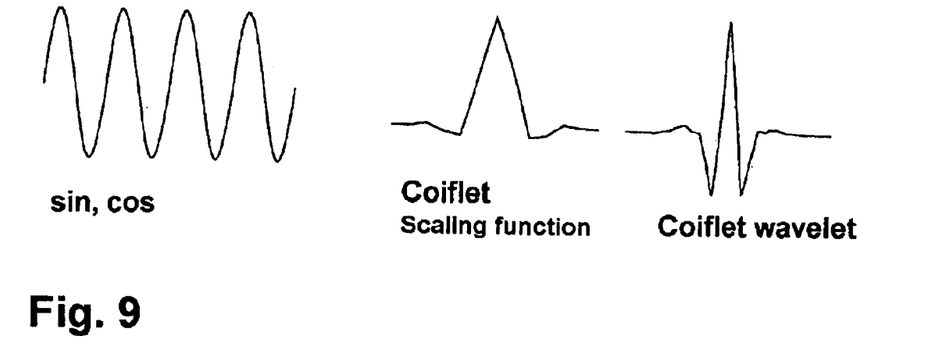
FIG. 9 shows the basic functions used in a Fourier transformation and in a wavelet transformation.

The principle of wavelet transformation can most easily be illustrated by reference to a comparison with the Fourier transformation. Both transformations expand the original signal into a series of basic functions. In the case of the Fourier transformation $$f(x) = \frac{1}{2}a_0 + \sum_{n=1}^{\infty} \left[ a_n \cos(n\omega_0 x) + b_n \sin(n\omega_0 x) \right] \quad (4)$$

the basic functions are sinusoidal functions. For the wavelet transformation:

$$f(x) = \sum_{k=-\infty}^{\infty} \lambda_{0,k} \varphi(x-k) + \sum_{k=-\infty}^{\infty} \sum_{j=0}^{\infty} \gamma_{j,k} \psi(2^j x - k) \quad (5)$$

the basic functions are the scaling function $\phi$ and the wavelet function $\psi$. There is not only one pair of scaling and wavelet functions but a very large number of families of $\phi$ and $\psi$ pairs with different properties which make them each particularly suitable for specific applications. In contrast to sinusoidal functions, scaling functions and wavelets are "small waves" whose energy is concentrated in a final interval on the x axis (time or space) cf. FIG. 9. This makes it possible to carry out analyses of time and frequency simultaneously. Scaling functions and wavelets are distinguished by the following properties (cf. C. S. Burrus, R. A. Gopinath, H. Guo: Introduction to wavelets and wavelet Transforms, A Primer; Prentice Hall, Upper Saddle River, N.J., 1998):

1. The wavelet systems are generated from a single scaling function or a wavelet by translation (that is to say determination of the location of the energy of $\phi$ or $\psi$ at various locations along the independent axis by subtraction of k) and scaling (that is to say compression or expansion of the independent axis by multiplication of x by $2^j$). The scaling functions are given by $$\phi_{0,k}(x)=\phi(x-k) k \epsilon Z. \quad (6)$$

The "mother wavelet" $\psi(x)$ is displaced and scaled by two-dimensional parameterization $$\psi_{j,k}(x)=2^{j/2}\psi(2^j x-k) j, k \epsilon Z \quad (7),$$

Z being the quantity of all the integers and the factor $2^{j/2}$ ensuring a constant standardization independent of the scale j.

2. Most wavelet systems fulfill the multi-resolution conditions $$\varphi(x) = \sum_n \tilde{h}(n) \cdot 2^{1/2} \varphi(2x-n), \quad n \in Z \quad (8)$$

$$\psi(x) = \sum_n \tilde{g}(n) \cdot 2^{1/2} \varphi(2x-n), \quad n \in Z$$

These conditions state that a scaling function $\phi$ or a wavelet $\psi$ can be represented by a weighted sum of displaced scaling functions $\phi(2x)$ of the next level with a higher resolution. $\tilde{h}(n)$ and $\tilde{g}(n)$ are what are referred to as the weighting or filter coefficients.

The multi-resolution property signifies that every signal which can be represented by a weighted sum of $\phi(x-k)$ can also be represented by a weighted sum of $\phi(2x-k)$. If the basic function is half as wide and displaced in steps which are half as wide, they can pick up finer details and therefore cover a relatively large class of signals.

The objective of the Fourier transformation and of the wavelet transformation is to find coefficients $a_n$, $b_n$, $\lambda_{0,k}$ and $\gamma_{j,k}$ of the corresponding series representation as these can, under certain circumstances, make available more useful information on the signal than is directly apparent from the original signal. In contrast to the Fourier transformation, the discrete wavelet transformation maps a uni-dimensional, sampled signal into a two-dimensional field of coefficients whose two dimensions are the "time" k and the scale ("frequency") j. The approximation coefficients $\lambda$ contain all the remaining low-frequency information and therefore have only one index, the displacement k of the determination of location in time (or in space). Occasionally, the notation $\gamma_j(k)$ is used for $\gamma_{j,k}$ and $\lambda_0(k)$ for $\lambda_{0,k}$ in order to make clear the difference between the two indices.

Figure 10:
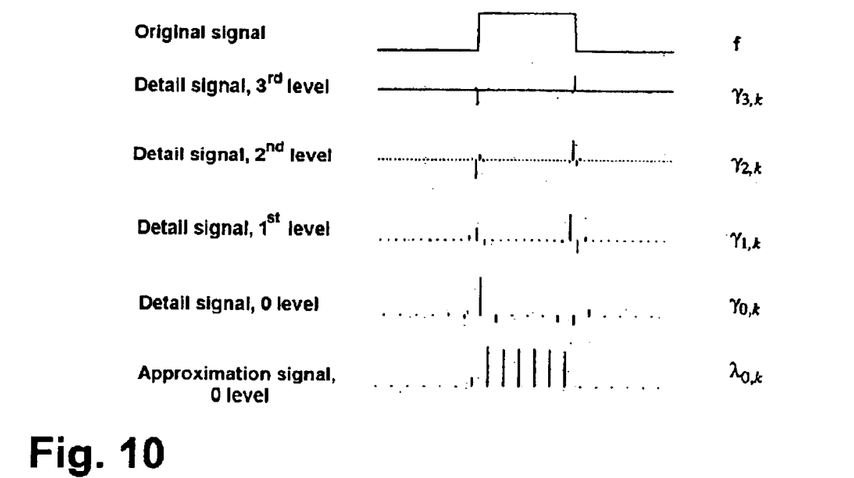
FIG. 10 shows a discrete wavelet transformation using the example of a square-wave pulse.

FIG. 10 shows the discrete wavelet transformation of a sample pulse signal, f, which illustrates the capability of the wavelet transformation to determine location. The detail signals indicate the location of the discontinuities in the original signal unambiguously here.

If the wavelet function or scaling function forms an orthogonal basis:

$$<\phi_{j,k}(x),\psi_{j,l}(x)>=\int \phi_{j,k}(x)\cdot\psi_{j,l}(x)dx=0 i,j,k,l \ \epsilon Z$$

$$\langle \varphi_{j,k}(x), \psi_{j,l}(x) \rangle = \int \varphi_{j,k}(x) \cdot \psi_{j,l}(x) dx = 0 \quad i, j, k, l \in Z \quad (9)$$

$$\langle \psi_{j,k}(x), \psi_{j,l}(x) \rangle = \int \psi_{j,k}(x) \cdot \psi_{j,l}(x) dx = c \cdot \delta_{ij} \delta_{kl}$$

-continued $$\delta_{ij} = \begin{cases} 1 & i = j \\ 0 & i \neq j \end{cases}$$

the approximation coefficients and detail coefficients can be calculated by determining the internal products $$\lambda_{0,k} = <f(x), \phi_{0,k}(x)> = \int f(x) \cdot \phi_{0,k}(x) dx$$

$$\gamma_{j,k} = <f(x), \psi_{j,k}(x)> = \int f(x) \cdot \psi_{j,k}(x) dx \quad (10)$$

However, in practice it proves inefficient to calculate the discrete wavelet transformation for determining the internal products. On the basis of multi-resolution conditions it is possible to show that scaling or wavelet functions should not be used directly. By considering $\lambda$ and $\gamma$ as sampled signals it is possible to find digital filters which calculate the approximation signals and detail signals on various scales. In this way, the following equations can be derived:

$$\lambda_j(k) = \sum_n \tilde{h}(-n) \cdot \lambda_{j+1}(2k - n) \quad (11)$$

$$\gamma_j(k) = \sum_n \tilde{g}(-n) \cdot \lambda_{j+1}(2k - n)$$

The digital filters are described by the coefficients $\tilde{h}(-n)$ and $\tilde{g}(-n)$. These are FIR (Finite Impulse Response) filters. The filter $\tilde{h}$ which is used for calculating the approximation signal is a low-pass filter, while $\tilde{g}$ which is used to calculate the detail signal is a high-pass filter.

Figure 11:
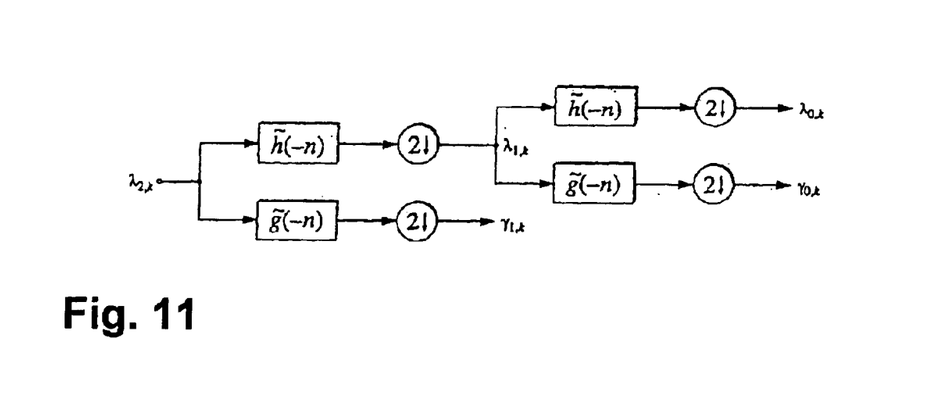
FIG. 11 shows the tree-like structure of the filters for the wavelet transformation.

According to equation (11), the sampling rate of the signals must be halved (down-sampled) after the filtering to obtain the signals $\lambda_{j,k}$ and $\gamma_{j,k}$ with a lower resolution. The filtering and the halving of the sampling rate can be performed iteratively on the approximation signals in order to find the entire wavelet decomposition with various scales j and a definitive approximation signal. The resulting tree-like structure of filters is shown in FIG. 11. In this example, the originally sampled signal $\lambda_{2,k}$ is decomposed into an approximation signal $\lambda_{0,k}$ and two detail signals $\gamma_{1,k}$ and $\gamma_{0,k}$.

While several modes for carrying out this invention have been described in detail, those familiar with the art to which this invention relates will recognize alternative designs and embodiments for practicing the invention. The above described embodiments are intended to be illustrative of the invention, which may be modified within the scope of the following claims.

We claim:

1. A method for detecting the start of combustion in a combustion chamber of an internal combustion engine with autoignition, with a cylinder pressure signal being generated, the method comprising:
   processing the cylinder pressure signal with a wavelet transformation which provides wavelet coefficients; and
   comparing said wavelet coefficients to an evaluation criterion to determine a start of combustion in said combustion chamber.

2. The method of claim 1, wherein said evaluation criterion is a sudden rise in the absolute value of said wavelet coefficients exceeding a predetermined threshold value.

3. The method of claim 2, wherein said predetermined threshold value depends on at least one engine operating parameter.

4. The method of claim 3, wherein said engine operating parameter is at least one of engine speed and torque.

5. The method of claim 1, wherein a discrete wavelet transformation is applied to the cylinder pressure signal.

6. The method of claim 1, wherein wavelet functions and scaling functions are applied, the method further comprising: filtering said cylinder pressure signal by sequential high-pass filtering and low-pass filtering of said cylinder pressure signal.

7. The method of claim 6, further comprising: acquiring said wavelet coefficients by said high-pass and low-pass filtering of said pressure signal.

8. The method of claim 7, wherein no sampling reduction takes place between said high-pass filtering and low-pass filtering operations.

9. The method of claim 7, wherein approximations for said low-pass and high-pass filters are used and said wavelet functions and said scaling functions are calculated with said approximations.

10. A system for detecting a start of combustion in a combustion chamber of an internal combustion engine comprising:
    A cylinder pressure measurement device disposed in the combustion chamber; and
    an electronic control unit coupled to the engine and said cylinder pressure measurement device, said electronic control unit receiving a cylinder pressure signal from said cylinder pressure measurement device, said electronic control unit performing a wavelet transformation on said cylinder pressure signal wherein said wavelet transformation provides wavelet coefficients, said electronic control unit further determining the start of combustion when an absolute value of at least one of said wavelet coefficients exceeds a predetermined threshold.

11. A computer readable storage medium having stored data representing instructions executable by a computer to control an internal combustion engine having at least one cylinder in which pressure is measured to provide a cylinder pressure signal, comprising:
    instructions to process the cylinder pressure signal with a wavelet transformation which provide wavelet coefficients;
    instructions to detect a start of combustion based on comparing said wavelet coefficients to a predetermined threshold; and
    instructions to adjust an engine parameter based on said detected start of combustion.

12. The media of claim 11 wherein said engine parameter is one of fuel injection timing, oxygen concentration, cylinder pressure, and cylinder temperature.

13. The media of claim 11 wherein said engine parameter adjustment is feedback controlled on said start of combustion.

14. The media of claim 11 wherein said predetermined threshold value is based on one or more of engine speed and engine torque.

15. The media of claim 11 wherein said start of combustion is determined when an absolute value of said wavelet coefficient exceeds said predetermined threshold.

16. The media of claim 11 wherein said start of combustion is based on a first occurrence of said absolute value of said wavelet coefficient exceeding said predetermined threshold.

17. The media of claim 11 wherein said wavelet transformation is a discrete wavelet transformation.

18. A method for regulating the start of combustion in a combustion chamber of an internal combustion engine, the method comprising:

detecting the start of combustion by:
   generating a signal indicating cylinder pressure;
   processing said cylinder pressure signal with a wavelet transformation which provides wavelet coefficients; and
   determining said start of combustion based on comparing said wavelet coefficients with a predetermined threshold value; and adjusting an engine operating parameter by feedback control on said detected start of combustion.

19. The method of claim 18, wherein said engine operating parameter is one or more of fuel injection timing, cylinder temperature, cylinder pressure, and oxygen concentration of gases in the combustion chamber.

* * * * *